United States Patent Office 3,295,033
Patented Dec. 27, 1966

3,295,033
POSITION CONTROL SYSTEM WITH HEATED RESISTOR FEEDBACK NETWORK
Elwood T. Davis, Havertown, and Raymond L. Davis II, Newtown Square, Pa., assignors to Leeds & Northrup Company, a corporation of Pennsylvania
Filed Nov. 7, 1963, Ser. No. 322,190
7 Claims. (Cl. 318—18)

This invention relates to automatic control systems of the rebalanceable type for operating a final control element to vary in one direction or the other the magnitude of a condition-controlling effect to maintain the magnitude of a condition at a predetermined value and has for an object the provision of an improved low cost control system to operate the electric drive units with proportional and automatic reset actions with minimum complexity.

In accordance with the present invention, there is provided a position control system for maintaining the magnitude of a condition at a predetermined value by operating a final control element to vary in one direction or the other the magnitude of a condition-controlling effect. The system includes actuating means for the final control element and selector means for controlling the direction of operation of the actuating means. There is also included in the system at least two pairs of resistors connected in a bridge network for producing an output signal depending upon the magnitude of the unbalance of the bridge network. One pair of the resistors is of low mass and the other pair of resistors is of high mass. Means is provided in the system for heating one resistor of each pair of resistors when the selector means controls the actuating means in one direction and for heating the other resistor of each pair of the resistors when the selector means controls the actuating means in the other direction. Connected between the pairs of resistors is means for selecting the relative effectiveness of each pair in producing the output signal from the bridge network. The system further includes means for producing a deviation signal corresponding in polarity and magnitude to the direction and extent of deviation of the magnitude of the condition from the desired value and means responsive to the difference between the deviation signal and the bridge network output signal for operating the final control element to return the magnitude of the condition to the desired value. This control system, while of minimum complexity, includes means for independently adjusting the proportional band and the reset rate.

Figure 1:
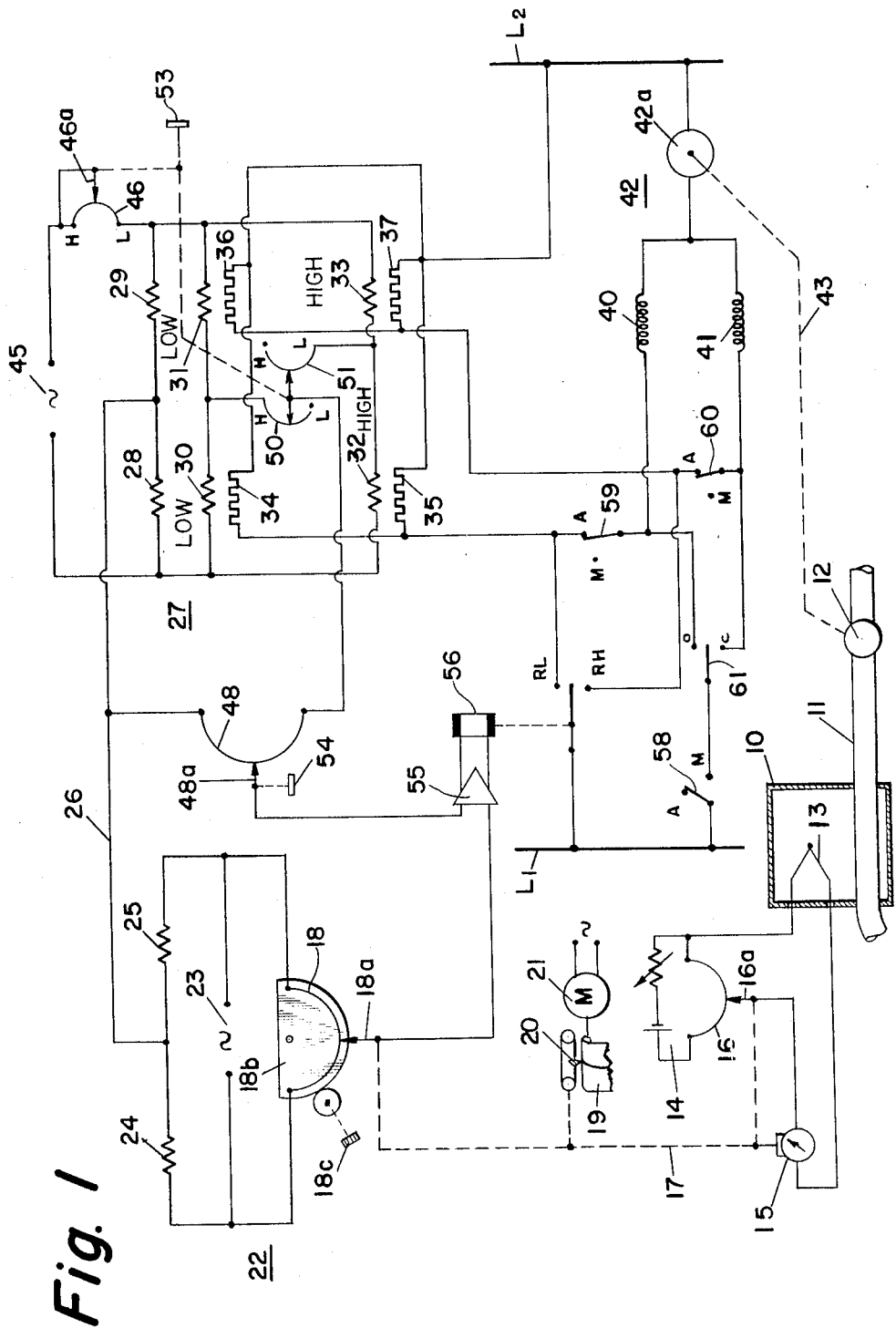
Figure 2:
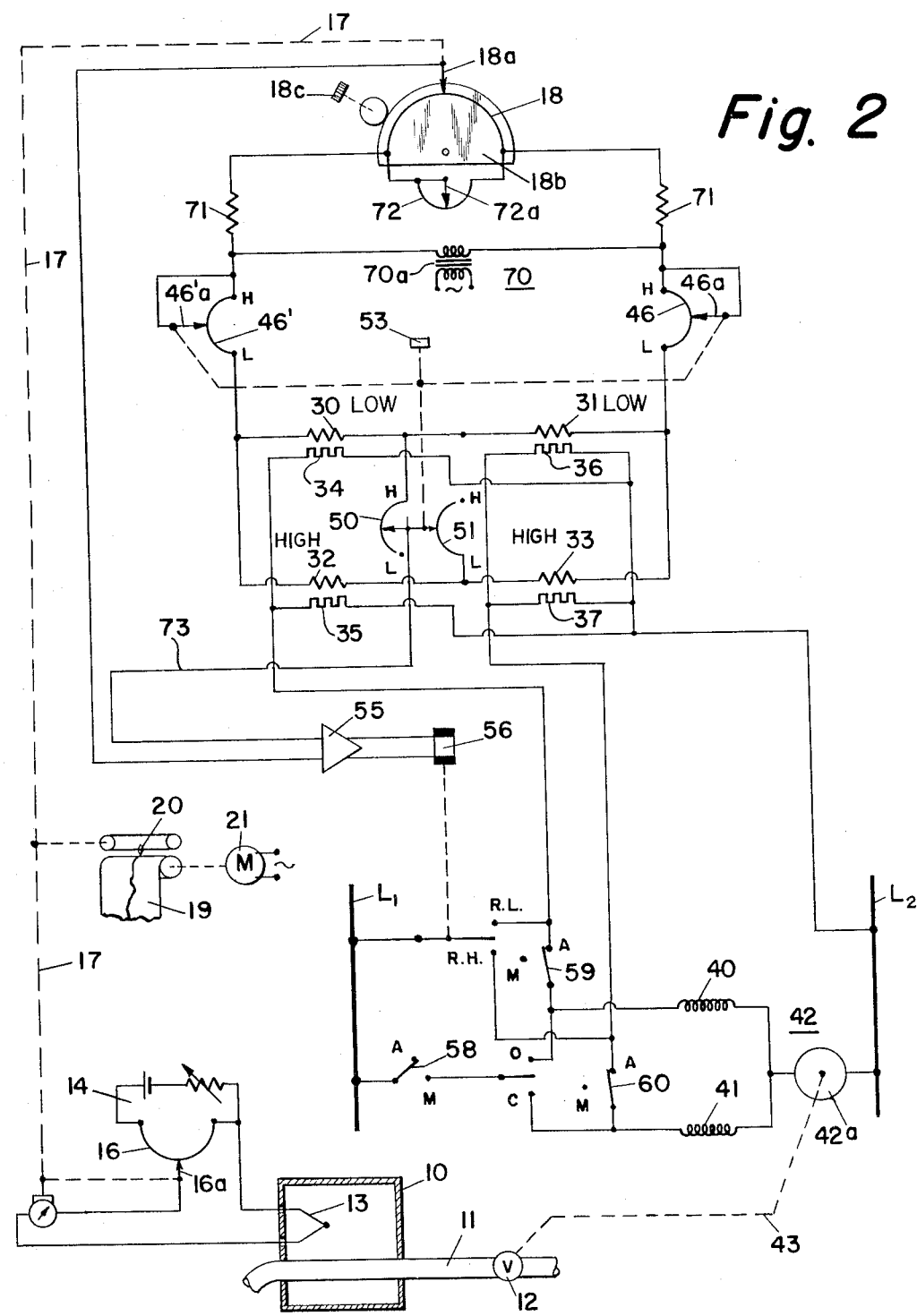

For further objects and advantages of the invention, reference is to be had to the following detailed description taken in conjunction with the accompanying drawings, in which:

FIG. 1 diagrammatically illustrates a control system embodying the present invention; and FIG. 2 diagrammatically illustrates a modification of the present invention.

Referring to FIG. 1, the invention in one form has been shown as applied to the control of the magnitude of a condition which is illustrated as the temperature of a furnace or heat-treating device represented by a compartment or chamber 10 through which there extends a heat transferring coil 11, the heating medium thereof being under the control of the final control element of the system and which is shown as a valve 12. A thermocouple 13 subject to the temperature within the chamber 10 applies a voltage to a measuring circuit 14. The measuring circuit 14 is of the potentiometer type well known in the art and includes detecting means 15 which serves not only to detect unbalance of the voltage developed by the thermocouple 13 and the output from the potentiometer including slidewire resistor 16 and its contact 16a in the measuring circuit 14, but also serves to adjust contact 16a relative to slidewire 16 to produce a balance and through mechanical connection 17 relatively to adjust a slidewire 18 with respect to its contact 18a. While in FIG. 1 the contact 18a has been illustrated as adjustable, it is to be understood that in practice the slidewire 18 may be rotated relative to the stationary contact 18a. The same understanding applies as to slidewire 16 and contact 16a. The detecting means or device 15 is preferably of the electronic type, such as shown in Williams Patent No. 2,113,164. However, it may be of the mechanical type as illustrated in Squibb Patent No. 1,935,732. In general, it will have associated with it a scale and an index, not shown, and a chart 19 and a pen 20 for presenting a continuous indication of temperature and a record of that temperature recorded against time. The chart 19 is adapted to be driven from a suitable drive motor 21.

The slidewire 18 forms part of a control bridge 22 having a source of supply indicated at 23 connected across a pair of resistors 24 and 25 preferably of equal value. As shown in FIG. 1 the slidewire 18 is mounted on a support or disc 18b which is rotatable about a central pivot as by a knob 18c and suitable drive. The knob 18c adjusts the set point or predetermined value at which the temperature of chamber 10 is to be maintained. When the temperature is at the set point, the contact 18a is at the electrical center of the slidewire 18 and there is no voltage between the contact 18a and the juncture of resistors 24 and 25. If the temperature deviates from the set point the contact 18a will be displaced from the electrical center of slidewire 18 and a voltage will then exist between contact 18a and the juncture of resistors 24 and 25 of magnitude depending upon the deviation, and of polarity depending upon direction of the deviation. A circuit from the juncture of resistors 24 and 25 extends by way of conductor 26 to a juncture between another pair of equal-valued resistors 28 and 29 in a feedback bridge 27. The feedback bridge 27 is of the six-arm type and in addition to resistors 28 and 29 includes one pair of resistors 30 and 31 of low mass and a second pair of resistors 32 and 33 of high mass. The heating coils 34 and 35 are respectively intimately thermally associated with resistors 30 and 32 which may be made of nickel or other suitable material having substantial temperature coefficient of resistance. The heating coil 34 may be wound on the same form as resistor 30 and the assembly so produced is preferably of small mass, low thermal inertia, to insure rapid increase and decrease in resistance of resistor 30 upon energization and de-energization respectively of the heater 34. The heating coil 36 and resistor 31 also comprise an assembly of low heat lag substantially equal to that of assembly 30, 34.

The resistances 32 and 33 are also of nickel or other material having a substantial temperature coefficient of resistance and are wound upon the same forms as, or otherwise intimately thermally associated with the heater windings 35 and 37, respectively. The heater windings 34-37 are adapted to be energized from a suitable source such as indicated by the line $L_1$, $L_2$ as are the control windings 40 and 41 of the reversible motor 42 which is adapted to drive from armature 42a the final control element or valve 12 by way of mechanical connection 43.

The feedback bridge 27 is provided with a source of supply indicated at 45 connected across resistors 28 and 29. The supply sources 45 and 23 preferably are derived from the same primary source. If not, then they should be individually regulated to provide constant-voltage sources. A variable resistance 46 is connected in series with the source of supply voltage 45 to determine the magnitude of the voltage supplied to the feedback bridge 27. Connected across the output of the feedback bridge 27 is an adjustable resistor 48 serving as a potentiometer or voltage divider. One end of the resistor 48 is connected to the conductor 26 leading to the common juncture between resistors 28 and 29 and the opposite end of resistance 48 is connected to the adjustable contacts of a pair of potentiometers 50 and 51 which are ganged with the adjustable contact 46a of variable resistance 46 for concurrent adjustment as by knob 53. The resistance or slidewire 48 and its adjustable contact 48a are relatively adjustable by means of a knob 54 to adjust the proportional band of the control system by selecting an appropriate portion of the output voltage from the feedback bridge 27.

The output from the potentiometer 48 and the output from the bridge 22 are connected in series in the input to the amplifier 55 which is responsive to the difference between the deviation signal, produced by the control bridge 22 and corresponding in polarity and magnitude to the direction and extent of deviation of the magnitude of the condition from the desired value, and the output signal from the feedback bridge network 27 as attenuated by potentiometer 48. The amplifier 55 may be of the type shown in Davis Patent No. 2,530,326 and operates a relay 56 to close contacts RL or RH for energizing the heaters 34, 35 or 36, 37 and for energizing the windings 40 or 41 of motor 42 for operating the final control element 12 in a direction to return the magnitude of the condition to the desired value.

Referring to FIG. 1, the switches 58, 59 and 60 in the heater and motor circuits have been shown in engagement with contacts A for automatic control. Unbalance of the control bridge 22 closes either contact RL or RH to operate the drive unit 42 in either the valve open or closed direction, so as to control the process. At the same time the drive unit motor 42 is operating, energy is applied to the heater windings of either the coils 34 and 35 for a valve opening operation or the coils 36 and 37 for a valve closing operation. The resistance windings 30, 32 or 31, 33 of these heated coils or thermal assemblies respond by generating an unbalance in the feedback bridge 27 which opposes the unbalance in the control bridge 22 and acts to restore the amplifier 55 and its output relay 56 to a null condition.

Assuming a given sustained deviation of the measured variable below the set point, the control bridge 22 will be unbalanced and without a corresponding balancing signal from the feedback bridge 27, the relay contact RL will close. The closure of contact RL produces two actions; namely, it serves to energize the heater windings 34 and 35 and it simultaneously energizes the winding 40 of motor 42 to cause the latter to move the control valve 12 in the open direction. Application of heat to the resistors 30 and 32 from the heaters 34 and 35 changes their resistance and unbalances the feedback bridge 27 and serves to generate a feedback bridge signal in opposition to the signal from the control bridge 22. When the feedback bridge signal becomes equal to that from the control bridge 22, the amplifier 55 is balanced and the relay contact RL opens. Upon subsequent cooling of the thermal assemblies including resistors 30 and 32, the feedback bridge signal decays and the resultant signal unbalance results in contact RL again closing, and the above described cycle is repeated. This pulsing action continues as long as the control bridge 22 is unbalanced, with the drive motor 42 moving the valve 12 further and further in the open direction. The pulsing action stops only when the effect of this corrective action on the process results in the controlled variable being restored to the set point to balance the control bridge 22. The larger the sustained unbalance of the control bridge 22, the greater must be the restoring signal from the feedback bridge 27. In order to generate a larger feedback bridge signal, the thermal assemblies must be maintained at a higher elevation in temperature. At that higher temperature, the temperature increases at a slower rate with the heaters energized and decreases at a faster rate with the heaters de-energized. Consequently, the percent "On" time of the motor 42 will be proportional to the temperature at which the resistors must be maintained. Accordingly, the motor 42 is operated at an average speed dependent upon the magnitude of the deviation from the set point to provide a reset action in the control system.

The variable resistance 46 serves to adjust the rate of reset since it determines the magnitude of the voltage supplied to the feedback bridge 27 which in turn determines the temperature elevation of the thermal assemblies required to produce a given signal from the feedback bridge. In order to prevent the adjustment of resistance 46 from disturbing the proportional band, as adjusted by a variable resistor 48, the compensating potentiometers 50 and 51 are ganged with the variable resistor 46 for concurrent adjustment. When the contact 46a is at the low end "L" of resistor 46, resulting in maximum voltage on the feedback bridge 27, potentiometer 50 has open circuited at the low end "L" of its travel and potentiometer 51 is at zero resistance. Thus, it will be seen that with the control knob 53 in this position, the feedback bridge signal is determined entirely on the unbalance of the high mass thermal assemblies including resistors 32 and 33. Since the high mass thermal assemblies are designed to respond slowly and produce a small unbalance in the feedback bridge 27 for a given pulse input, compensation is produced which counteracts the high bridge voltage as adjusted by the variable resistance 46. Conversely, when the variable resistance 46 is adjusted so that its contact 46a is at its high end "H" to produce high reset rate, the compensating potentiometer 51 is open circuited and the compensating potentiometer 50 is at its zero resistance end "H." Accordingly, the feedback bridge signal is now derived from the small mass coils of resistors 30 and 31 which produce a larger unbalance in response to a given pulse of energy, thus compensating for the low bridge voltage as adjusted by variable resistor 46 and keeping the proportional band constant.

It will be noted that the arrangement as described above provides first a proportional band adjustment by way of resistor 48 and contact 48a which changes the proportional band. The reset adjustment provided by variable resistor 46 and contact 46a and adjustment of potentiometers 50 and 51 as described above adjusts the reset rate in terms of repeats per minute of the proportional action since the proportional band is kept constant by the concurrent adjustment of potentiometers 50 and 51 as described above.

While the control system of FIG. 1 has been described in connection with automatic control, it is to be noted that the system also includes means for transferring from automatic to manual control. For manual control, the switches 58, 59 and 60 are moved to position for engagement with contacts M. When the system is adjusted for manual control, the control of the drive motor 42 will be affected by manually operated switch 61 which is shown in a center or off position. When the switch 61 is moved into contact with contact O, winding 40 will be energized to operate motor 42 and drive the final control element or valve 12 in an open direction. Conversely, when switch 61 is moved into engagement with contact C, the motor winding 41 will be energized to drive the motor 42 and operate the valve 12 in a closed direction. It will be noted that the heater circuits from contacts RL and RH are not interrupted on manual control. Consequently, the control system acts to keep the amplifier input at an average value of zero as long as the measured variable is within the proportional band. Accordingly, under these conditions, when the control is switched from Manual to Automatic, there will be no step change in the position of final control element 12.

The control system also provides bumpless transfer in going from Automatic to Manual control.

It is to be noted that when the temperature is approaching the set point after a sustained departure therefrom, as for example on process start-up, the thermal assemblies including resistors 30 and 32 will be heated to a maximum value in attempting to match the feedback signal to the signal from the control bridge 22. If the rate of temperature rise through the proportional band is sufficiently rapid so that the change in output signal from the control bridge 22 is greater than the change in output signal from the feedback bridge 27 due to the natural rate of cooling from the thermal assemblies including resistors 30 and 32, a reversal of the amplifier input signal will occur and reverse control action will result. This serves to cutback the fuel input and reduces or avoids initial overshoot of the set point. The slower the reset setting, the stronger will be the "rate of approach" effect since the high mass coils of resistors 32 and 33 will have a slower rate of cooling than the low mass coils of resistors 30 and 31.

Referring to FIG. 2, there is shown a modification of the control system of FIG. 1. In FIG. 2 the control system illustrates a form where the control bridge has been combined with the feedback bridge with a common power supply. In FIG. 2 the power supply has been illustrated in the form of transformer 70 having a secondary 70a across which is connected the slidewire 18. The opposite ends of the slidewire 18 are connected to equal value end coils or dropping resistors 71. Connected across the ends of the slidewire 18 is a proportional band rheostat 72 having an adjustable contact 72a. Adjustment of the rheostat 72 changes the deviation signal between the contact 18a and the center point of the transformer secondary winding 70a for any given displacement of contact 18a from the electrical center of the slidewire 18. In FIG. 2 the reset rate adjustment is provided by a pair of variable resistors 46 and 46' which are in series with the supply voltage derived from the transformer secondary winding 70a. The adjustable resistor 46 and its contact 46a function in the same manner as in the system of FIG. 1 to adjust the voltage supplied to the feedback bridge including resistors 30–33. The second adjustable resistor 46' is included in the circuit at the opposite end of the transformer secondary winding 70a to maintain a balance across the bridge network while changing the effective voltage supplied by adjustment of contacts 46a and 46'a. The resistors 46 and 46' are concurrently adjusted by means of knob 53 and this arrangement maintains equality in the resistance circuits extending from the opposite sides of the transformer 70 to the output conductor 73 leading to one side of the amplifier 55. For purposes of clarity, all of the corresponding parts of the systems in FIG. 2 have been identified by the same reference characters as used in FIG. 1. On deviation of the temperature in furnace 10 from the set point, the system of FIG. 2 operates to close one of the other of contacts RL or RH to energize the corresponding heater windings and control windings for the motor to operate the final control element or valve 12 in the desired direction to return the magnitude of the condition to the desired valve. This operation is the same as previously described in detail in connection with FIG. 1.

In accordance with a further modification of the invention, the variable resistance 46 may be eliminated from the feedback bridge 27 of FIG. 1 and the magnitudes of the resistances 34–37 changed so that the small mass coils 30 and 31 and the large mass coils 32 and 33 heat at the same rate. Since the small and large mass coils heat at the same rate, they will produce the same proportional action. Since they will cool at different rates, they will produce different reset actions. As a result, the reset rate can be adjusted by adjusting the compensating potentiometers 50 and 51 without disturbing the proportional action.

While the control systems disclosed herein have been illustrative of the alternating current type, it is to be understood that such systems may also be supplied from a direct voltage source. The term polarity is used herein to have its usual meaning in connection with systems embodying the present invention when supplied from a direct voltage source, and to mean the instantaneous relative polarity or phase when alternating voltage is used. Although the invention has been illustrated as applied to a system in which the control bridge unbalance is produced by a recorder, it is to be understood that the control bridge may include a resistance thermometer for producing the unbalance such as shown in the aforesaid Davis Patent No. 2,530,326 and no recorder is necessary.

It is to be understood that the present invention is not limited to the arrangements described and illustrated herein but is also applicable to other modifications within the scope of the appended claims.

What is claimed is:

1. In a position control system for maintaining the magnitude of a condition at a predetermined desired value by operating a final control element in one direction or the other vary in one direction or the other the magnitude of a condition-controlling effect, actuating means for the final control element, selector means for controlling the direction of operation of said actuating means, at least two pairs of resistors connected in a bridge network, one pair of said resistors having a low thermal inertia and the other pair of said resistors having a high thermal inertia, said bridge network including one of said resistors in each arm thereof, means responsive to said selector means and independent of said actuating means for heating one resistor of each pair of said resistors when said selector means controls said actuating means in one direction and for heating the other resistor of each pair of said resistors when said selector means controls said actuating means in the other direction, means connected between said pairs of resistors for selecting the relative effectiveness of each pair in producing the output signal from said bridge network, means for producing a deviation signal corresponding in polarity and magnitude to the direction and extent of deviation of said magnitude of said condition from the desired value, and means responsive to the difference between said deviation signal and said bridge network output signal for energizing said selector means for operation of said actuating means in operating the final control element to return said magnitude of said condition to said desired value.

2. In a position system according to claim 1 including an adjustable resistance in circuit with the supply voltage to said bridge network for controlling the magnitude of the voltage supplied to said bridge network and adjusted concurrently with said means connected between said pairs of resistors.

3. In a position control system according to claim 1 wherein proportional band adjustment is provided by a potentiometer connected across the output of said bridge network and said means for energizing said selector means is responsive to the difference between said deviation signal and the output from said potentiometer.

4. In a position system according to claim 1 wherein said pair of resistors of high thermal inertia and said pair of resistors of low thermal inertia all heat at the same rate and, thus, have the same proportional action and where said pairs of resistors cool at different rates thereby having different reset action, and said means connected between said pairs of adjustable without disturbing the proportional action of said system.

5. In a position control system according to claim 1 wherein manual control is provided with the selector means controlling the heating and with the actuating means manually controlled.

6. In a position control system for maintaining the magnitude of a condition at a predetermined desired value by operating a final control element in one direction or the other to vary in one direction or the other the magnitude of a condition-controlling effect, a balanceable network including a slidewire and contact relatively movable in accordance with the deviation of the magnitude of the condition from its desired value to produce an effect in the output from said network in accordance with said deviation, said balanceable network further including a bridge having at least two pairs of resistors for providing a rebalancing signal in said network, one pair of said resistors having a low thermal inertia and the other pair of said resistors having a high thermal inertia, said bridge including one of said resistors in each arm thereof, actuating means for the final control element, means responsive to the output from said balanceable network for selectively energizing said actuating means for operating the final control element in one direction or the other depending upon the polarity of said output, means responsive to said last-mentioned means and independent of said actuating means for heating one resistor of each pair of said resistors when said actuating means is energized for operation in one direction and for heating the other resistor of each pair of said resistors when said actuating means is energized for operation in the other direction to restore said network to temporary balance and for continued intermittent operation until said condition is restored to its said desired value, and means connected between said pairs of resistors for selecting the average speed of operation of said actuating means as a result of said intermittent operation.

7. In a position control system for maintaining the magnitude of a condition at a predetermined desired value by proportional and reset action on the position of a final control element, a balanceable network including means for producing a deviation signal corresponding in polarity and magnitude to the direction and extent of deviation of said magnitude of said condition from the desired value, said balanceable network further including a bridge having at least two pairs of resistors for providing a rebalancing signal in said network, one pair of said resistors having a low thermal inertia and the other pair of said resistors having a high thermal inertia, said bridge having one of said resistors in each arm thereof, actuating means for the final control element, means responsive to the output from said balanceable network for selectively energizing said actuating means for operating the final control element in one direction or the other depending upon the polarity of said output, means responsive to said last-mentioned means and independent of said actuating means for heating one resistor of each pair of said resistors when said actuating means is energized for operation in one direction and for heating the other resistor of each pair of said resistors when said actuating means is energized for operation in the other direction to restore said network to temporary balance to provide a change in position of said actuating means in proportion to said deviation, proportional control adjustment means for adjusting the relative magnitude of said deviation and said rebalancing signals, the cooling of said resistors providing reset action by continued intermittent operation of said actuating means, and means connected between said pairs of resistors for adjusting said reset action.

References Cited by the Examiner

UNITED STATES PATENTS

| | | | |
|---|---|---|---|
| 2,300,537 | 11/1942 | Davis | 318—29 X |
| 2,325,232 | 7/1943 | Davis. | |
| 2,325,308 | 7/1943 | Davis | 318—29 X |
| 2,666,889 | 1/1954 | Ehret et al. | |
| 2,694,169 | 11/1954 | Ehret. | |
| 2,823,861 | 2/1958 | Davis. | |

ORIS L. RADER, *Primary Examiner.*

JOHN F. COUCH, *Examiner.*

B. DOBECK, *Assistant Examiner.*